United States Patent
Huang (12)

(10) Patent No.: US 6,665,911 B1
(45) Date of Patent: Dec. 23, 2003

(54) CONCEALABLE BUCKLE APPARATUS

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 10/197,373

(22) Filed: Jul. 17, 2002

(51) Int. Cl.[7] .......................... A44B 11/25; A44B 21/00; B60R 21/00
(52) U.S. Cl. .................. 24/68 CD; 24/68 R; 24/163 K; 24/909; 297/468; 280/803; 410/105; 410/110
(58) Field of Search ............................... 24/68 CD, 909, 24/163 K, 68 R; 297/468, 486; 280/803; 410/105, 110; 182/116; 254/218

(56) References Cited

U.S. PATENT DOCUMENTS

| | | | | |
|---|---|---|---|---|
| 2,743,684 A | * | 5/1956 | Elsner | 410/110 |
| 3,265,439 A | * | 8/1966 | McEwen | 297/486 |
| 4,094,044 A | * | 6/1978 | Coker | 24/68 CD |
| 4,445,722 A | * | 5/1984 | Schaper | 297/468 |
| 4,850,769 A | * | 7/1989 | Matthews | 410/105 |
| 5,158,450 A | * | 10/1992 | Horita et al. | 24/68 R |
| 6,095,094 A | * | 8/2000 | Phillips | 119/792 |

* cited by examiner

Primary Examiner—Victor Sakran
(74) Attorney, Agent, or Firm—Alan Kamrath; Rider Bennett, LLP

(57) ABSTRACT

A concealable buckle apparatus includes a supporting element, a buckle, a locking device and a panel. The buckle is pivotally mounted on the supporting element between an extended position and a concealed position. The locking device is movably mounted on the supporting element between a locking position for locking the buckle in the concealed position and a releasing position. The panel is mounted on the supporting element and defining an opening through which the buckle extends in the extended position and a slot through which the locking device is accessible.

20 Claims, 4 Drawing Sheets

CONCEALABLE BUCKLE APPARATUS

BACKGROUND OF THE INVENTION

1. Field of Invention

The present invention relates to a concealable buckle apparatus for securely supporting a rope for holding cargo on a truck.

2. Related Prior Art

A truck is often used to transport cargo. When the cargo includes many items that are physically separate, ropes are often used to tie these items on the truck in order to avoid the items falling firm the truck during transportation. To support the ropes, a plurality of hooks is formed on the truck. However, these hooks may accidentally hook something or someone that happens to appear beside the truck. The accidental hooking may cause damage to property and/or people.

To avoid the above-mentioned problem, a concealable hook apparatus has been proposed in Taiwan Patent Publication No. 489962. This conventional concealable hook apparatus includes a panel 1 and a hook 4. The panel 1 defines a slot 12. The hook 4 is formed with a base 41. When idle, the hook 4 can be concealed via the panel 1. In use, the hook 4 can be inserted through the slot 12. The base 41 abuts the panel 1 so as to avoid disengagement of the hook 4 from the panel 1. The hook 4 is shaky relative to the panel 1. The hook 4 is shaped like the letter "C." A rope hooked on the hook 4 may be accidentally disengaged from the hook 4 due to vibration that inevitably happens during transportation.

The present invention is therefore intended to obviate or at least alleviate the problems encountered in the prior art.

SUMMARY OF INVENTION

It is the primary objective of the present invention to provide a concealable buckle apparatus for securely hooking a rope for holding cargo on a truck.

According to the present invention, a concealable buckle apparatus includes a supporting element, a buckle, a locking device and a panel. The buckle is pivotally mounted on the supporting element between an extended position and a concealed position. The locking device is movably mounted on the supporting element between a locking position for locking the buckle in the concealed position and a releasing position. The panel is mounted on the supporting element and defines an opening through which the buckle extends in the extended position and a slot through which the locking device is accessible.

The supporting element may define a recess for receiving the buckle.

The buckle may include a shaft formed with two ends and a U-shaped element formed with two lateral portions connected with the shaft and a central portion formed between the lateral portions for supporting a rope.

The recess may include two lateral walls each defining a groove for receiving one of the ends of the shaft of the buckle.

The buckle may define a recess. The locking device may include a latch for insertion in the recess defined in the buckle. The recess defined in the buckle may be a groove. The latch may be a longitudinal element for transverse movement into the groove.

The locking device may include a switch connected with the latch. The switch may define a hole into which an end of the latch is forced.

The concealable buckle apparatus may include a torque spring for biasing the buckle from the concealed position to the extended position.

The torque spring may include a U-shaped portion, two helical portions each extending from an end of the U-shaped portion and two linear portions each extending from one of the helical portions. The U-shaped portion of the torque is connected with the U-shaped element of the buckle. The helical portions are mounted on the shaft of the buckle. The linear portions are connected with the supporting element.

The concealable buckle apparatus may include a compression spring for biasing the switch in order to move the latch from the releasing position to the locking position.

Other objectives, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENT

Figure 1:
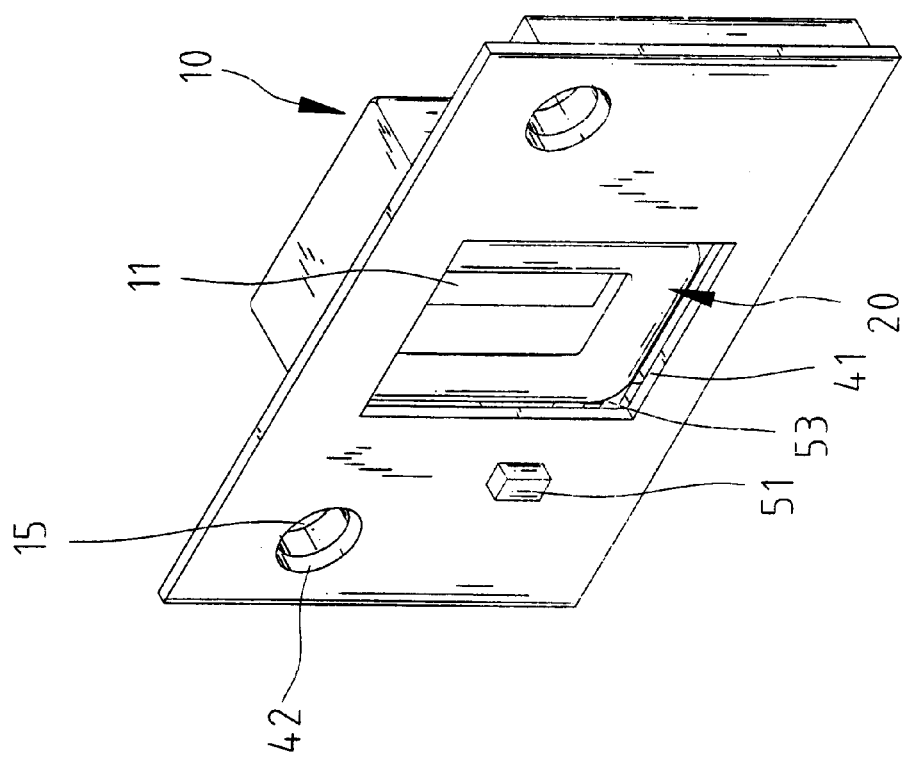
FIG. 1 is a perspective view of a concealable buckle apparatus according to the present invention.
Figure 2:
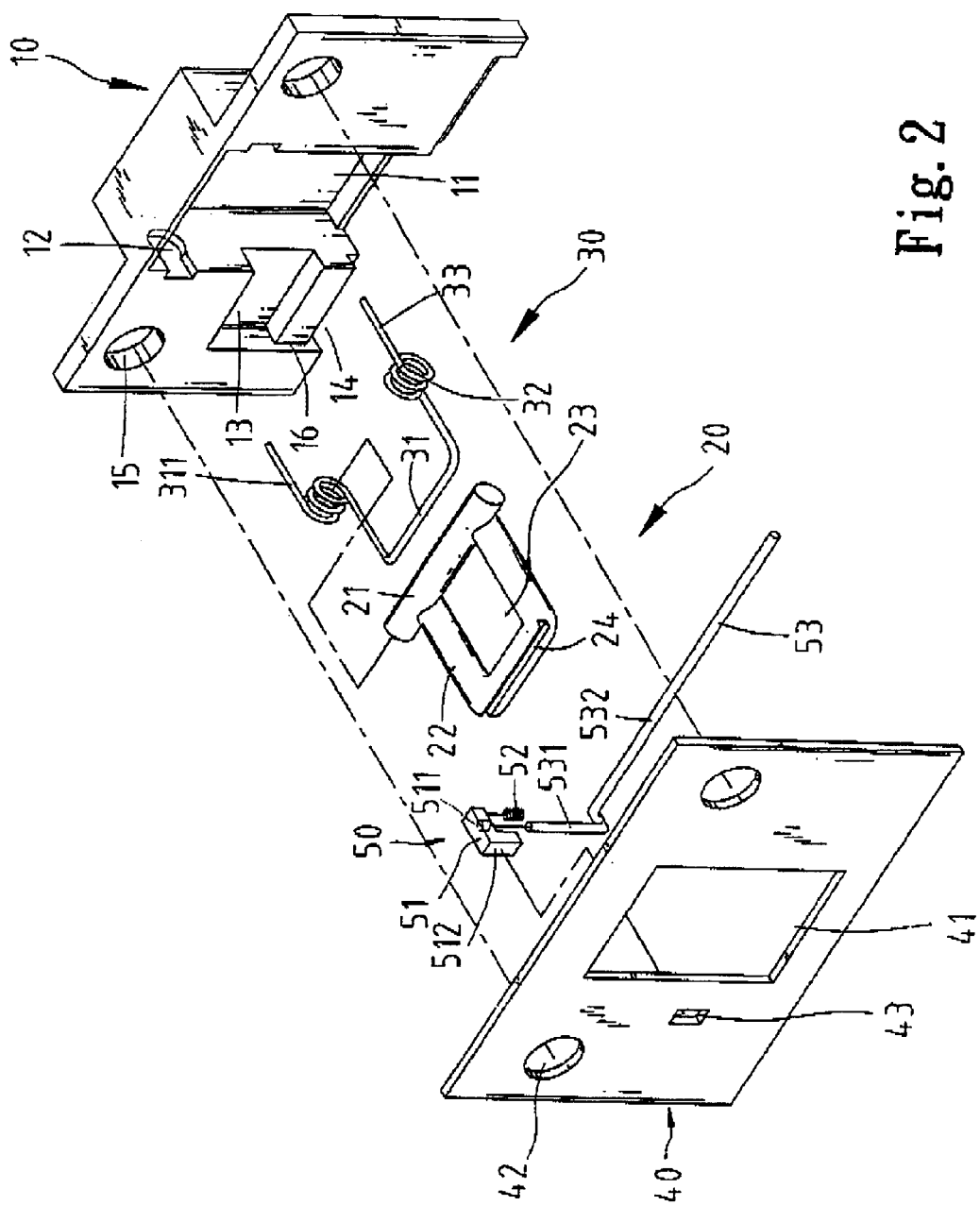
FIG. 2 is an exploded view of the concealable buckle apparatus according to the present invention.

Referring to FIGS. 1–5, according to the present invention, a concealable buckle apparatus includes a casing 10, a buckle 20, a spring 30, a locking device 50 and a panel 40.

The casing 10 includes a first recess 11 defined therein, a second recess 13 defined therein beside the first recess 11, a third recess 14 defined therein below the second recess 13, a fourth recess 16 through which the second recess 13 is communicated with the third recess 14 and two apertures 15 defined therein so that the first recess 11 is located between the apertures 15. The first recess 11 includes two lateral walls (not numbered) each defining a groove 12.

The buckle 20 includes a shaft 21 formed with two ends and a U-shaped element 22 formed with a central portion and two lateral portions secured to the shaft 21. A space 23 is defined in the buckle 20. The central portion of the U-shaped element 22 of the buckle 20 defines a groove 24.

The spring 30 includes a U-shaped portion 31, two helical portions 32 each extending from an end of the U-shaped portion 31 and two linear portions 33, 311 each extending from one of the helical portions 32.

The helical portions 32 of the spring 30 are mounted on the shaft 21 of the buckle 20 so that the U-shaped element 22 of the buckle 20 contacts the U-shaped portion 31 of the spring 30. The ends of the shaft 21 of the buckle 20 are slid into the grooves 12.

The locking device 50 includes a switch 51, a spring 52 and a latch 53. The switch 51 includes a first switch portion (not numbered) and a second switch portion 512 extending from the first switch portion perpendicularly. A hole 511 is defined in the first switch portion of the switch 51. The latch 53 includes a first latch portion 531 and a second latch portion 532 extending from the first latch portion 531 substantially perpendicularly. The first latch portion 531 of the latch 53 is forced into the hole 511 defined in the first switch portion of the switch 51 so that the switch 51 and the latch 53 are bound together. The first switch portion of the switch 51 is received in the second recess 13 defined in the casing 10. The spring 52 is compressed between the first switch portion of the switch 51 and a lower face of the recess 13. The first latch portion 531 of the latch 53 is received in the fourth recess 16 defined in the casing 10. The second latch portion 532 of the latch 53 is received in the third recess 14 defined in the casing 10.

The panel 40 includes an opening 41 defined therein, a slot 43 defined therein and two apertures 42 defined therein so that the opening 41 and the slot 43 are located between the apertures 42.

In assembly, the panel 40 is positioned against the casing 10 so that buckle 20, the spring 30 and the locking device 50 are positioned between the panel 40 and the casing 10 except for the U-shaped element 22 of the buckle 20 and the U-shaped portion 31 of the spring 30 that extend through the opening 41 defined in the panel 40 and the second switch portion 512 of the switch 51 that extends through the slot 43 defined in the panel 40. A bolt (not shown) can be inserted through one of the apertures 42 defined in the panel 40 and one of the apertures 15 defined in the casing 10 and driven into a receptacle (not shown) formed on or secured to a vehicle (not shown). Thus, the panel 40 is connected with the casing 10 and the concealable buckle apparatus is mounted on the vehicle.

Figure 3:
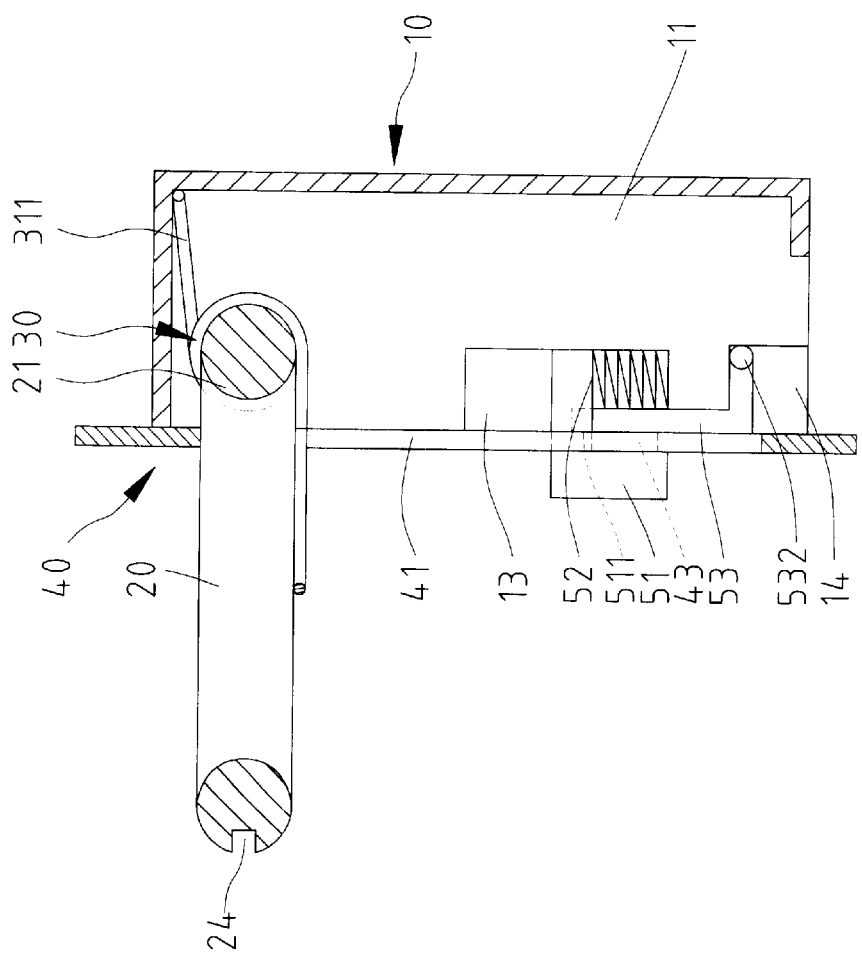
FIG. 3 is a cross-sectional view of the concealable buckle apparatus according to the present invention, showing a buckle in a fully extended position.

Referring to FIG. 3, the U-shaped element 22 of the buckle 20 extends through the opening 41 defined in the panel 40. Thus, a rope (not shown) can be inserted through the space 23 and supported via the buckle 20.

Figure 5:
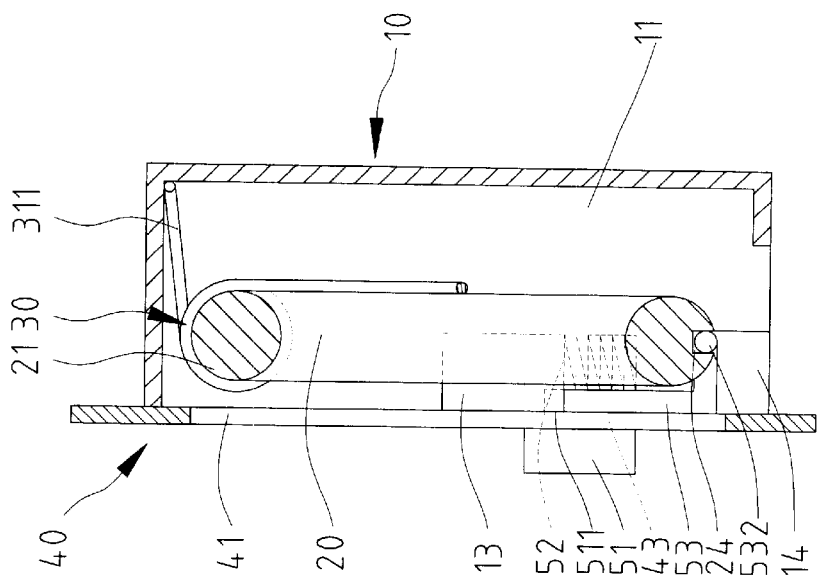
FIG. 5 is similar to FIG. 4 but showing the buckle in the concealed position.

When not wanting to use the buckle 20, a user can pivot the buckle 20 from the fully extended position shown in FIG. 3 to a concealed position shown in FIG. 5 In the pivoting of the buckle 20, the central portion of the U-shaped element 22 of the buckle 20 is brought into contact with the second latch portion 532 of the latch 53 and, due to its arc-shaped periphery, presses down the second latch portion 532 of the latch 53, thus pressing down the switch 51 and compressing the spring 52. When the central portion of the U-shaped element 22 of the buckle 20 is moved beyond the second latch portion 532 of the latch 53, the spring 52 pushes up the switch 51, thus bring the second latch portion 532 of the latch 53 into the groove 24 defined in the central portion of the U-shaped element 22 of the buckle 20. Therefore, the buckle 20 is locked in the concealed position via the locking device 50.

Figure 4:
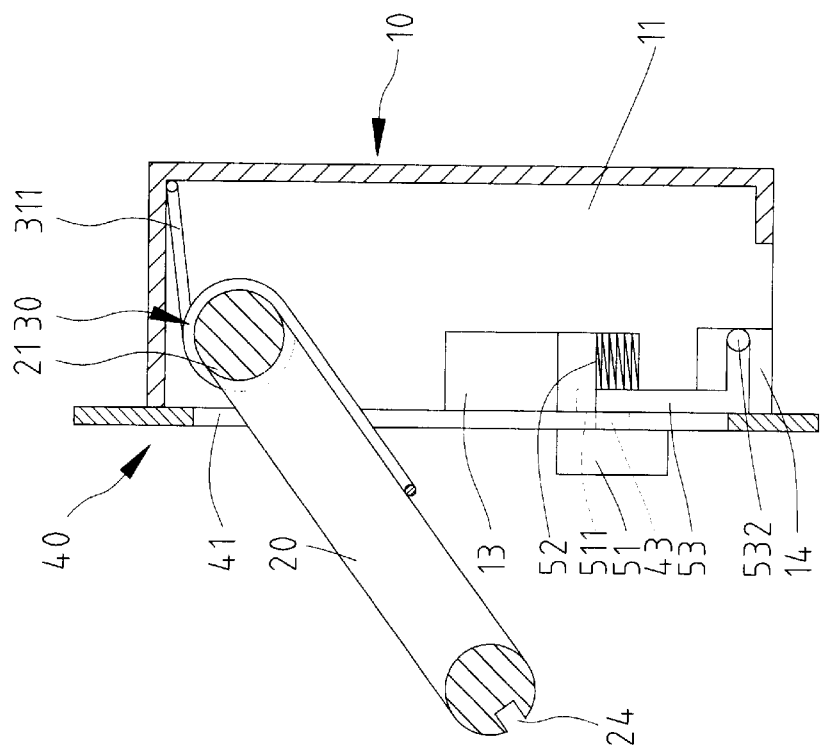
FIG. 4 is similar to FIG. 3 but showing a buckle in a position between the fully extended position and a concealed position.

To use the buckle 20, the user can move down the switch 51 as shown in FIG. 4 so as to move the second latch portion 532 of the latch 53 from the groove 24 defined in the central portion of the U-shaped element 22 of the buckle 20. When this occurs, the spring 30 pivots the buckle 20, thus extending the U-shaped element 22 of the buckle 20 through the opening 41 defined in the panel 40 to the fully extended position shown in FIG. 3.

The present invention has been described through detailed illustration of the preferred embodiment. Those skilled in the art can derive many variations from the preferred embodiment without departing from the scope of the present invention. Therefore, the preferred embodiment shall not limit the scope of the present invention. The scope of the present invention is defined in the attached claims.

What is claimed is:

1. A concealable buckle apparatus including:
    a supporting element;
    a buckle pivotally mounted on the supporting element between an extended position and a concealed position; and
    a locking device movably mounted on the supporting element between a locking position for locking the buckle in the concealed position and a releasing position;
    wherein the buckle includes a shaft formed with two ends mounted on the supporting element and a U-shaped element formed with two lateral portions connected with the shaft and a central portion formed between the lateral portions for supporting a rope.

2. The concealable buckle apparatus according to claim 1 wherein the supporting element defines a recess for receiving the buckle.

3. The concealable buckle apparatus according to claim 2 wherein the recess includes two lateral walls each defining a groove for receiving one of the ends of the shaft of the buckle.

4. The concealable buckle apparatus according to claim 1 including a spring for biasing the buckle from the concealed position to the extended position.

5. The concealable buckle apparatus according to claim 4 wherein the spring is a torque spring.

6. The concealable buckle apparatus according to claim 5 wherein the spring includes a helical portion mounted on the shaft of the buckle, a first terminal portion extending from the helical portion for connection with the buckle and a second terminal portion extending from the helical portion for connection with the supporting element.

7. The concealable buckle apparatus according to claim 1 wherein the spring includes a U-shaped portion connected with the U-shaped element of the buckle, two helical portions each extending from an end of the U-shaped portion and being mounted on the shaft of the buckle and two linear portions each extending from one of the helical portions for connection with the supporting element.

8. The concealable buckle apparatus according to claim 1 further including:
    a panel being mounted on the supporting element and defining an opening through which the buckle extends in the extended position and a slot through which the locking device is accessible.

9. The concealable buckle apparatus according to claim 1 further including:
    a panel being mounted on the supporting element and through which the buckle extends in the extended position and through which the locking device is accessible.

10. The concealable buckle apparatus including:
    a supporting element;
    a buckle pivotally mounted on the supporting element between an extended position and a concealed position; and
    a locking device movably mounted on the supporting element between a locking position for locking the buckle in the concealed position and a releasing position;
    wherein the buckle defines a recess, and the locking device includes a latch for insertion in the recess defined in the buckle.

11. The concealable buckle apparatus according to claim 10 wherein the recess defined in the buckle is a groove, and the latch is a longitudinal element for transverse movement into the groove.

12. The concealable buckle apparatus according to claim 11 wherein the longitudinal latch is moved into the groove in a transverse direction.

13. The concealable buckle apparatus according to claim 10 wherein the locking device includes a switch connected with the latch.

14. The concealable buckle apparatus according to claim 13 wherein the switch defines a hole into which an end of the latch is forced.

15. The concealable buckle apparatus according to claim 10 including a spring for biasing the latch from the releasing position to the locking position.

16. The concealable buckle apparatus according to claim 15 wherein the spring is a compression spring.

17. The concealable buckle apparatus according to claim 13 including a spring for biasing the switch in order to move the latch from the releasing position to the locking position.

18. The concealable buckle apparatus according to claim 15 wherein the spring is a compression spring.

19. The concealable buckle apparatus according to claim 10 further including:
   a panel being mounted on the supporting element and defining an opening through which the buckle extends in the extended position and a slot through which the locking device is accessible.

20. The concealable buckle apparatus according to claim 10 further including:
   a panel being mounted on the supporting element and through which the buckle extends in the extended position and through which the locking device is accessible.

* * * * *